United States Patent
Bertry et al.

(10) Patent No.: US 11,658,288 B2
(45) Date of Patent: May 23, 2023

(54) POSITIVE ELECTRODE COMPOSITION

(71) Applicant: RHODIA OPERATIONS, Aubervilliers (FR)

(72) Inventors: Laure Bertry, Aubervilliers (FR); Robin Amisse, Issy-les-Moulineaux (FR); Valérie Buissette, Paris (FR); Marc-David Braida, Bry-sur-Marne (FR); Stéphanie Lesturgez, La Rochelle (FR); Thierry Le Mercier, Rosny-sous-Bois (FR)

(73) Assignee: RHODIA OPERATIONS, Lyons (FR)

( * ) Notice: Subject to any disclaimer, the term of this patent is extended or adjusted under 35 U.S.C. 154(b) by 0 days.

(21) Appl. No.: 17/263,819

(22) PCT Filed: Jul. 30, 2019

(86) PCT No.: PCT/EP2019/070549
§ 371 (c)(1),
(2) Date: Jan. 27, 2021

(87) PCT Pub. No.: WO2020/025638
PCT Pub. Date: Feb. 6, 2020

(65) Prior Publication Data
US 2021/0305549 A1    Sep. 30, 2021

(30) Foreign Application Priority Data

Jul. 30, 2018 (FR) ........................................ 1857116

(51) Int. Cl.
| | |
|---|---|
| *H01M 4/36* | (2006.01) |
| *C01B 25/455* | (2006.01) |
| *H01M 4/58* | (2010.01) |
| *H01M 4/587* | (2010.01) |
| *H01M 4/62* | (2006.01) |
| *H01M 10/054* | (2010.01) |
| *H01M 4/02* | (2006.01) |

(52) U.S. Cl.
CPC .......... *H01M 4/364* (2013.01); *C01B 25/455* (2013.01); *H01M 4/587* (2013.01);
(Continued)

(58) Field of Classification Search
CPC ........................... H01M 4/054; H01M 4/0525
(Continued)

(56) References Cited

U.S. PATENT DOCUMENTS

2008/0153002 A1* 6/2008 Nazar ............... H01M 10/0525
429/221
2011/0052986 A1   3/2011 Barker et al.
(Continued)

FOREIGN PATENT DOCUMENTS

| | | |
|---|---|---|
| CN | 103594713 A | 2/2014 |
| CN | 103594716 A | 2/2014 |

(Continued)

OTHER PUBLICATIONS

K. Chihara et al., "Cathode properties of Na3M2(PO4)2F3 [M=Ti, Fe, V] for sodium-ion batteries", Journal of Power Source, 227, pp. 80-85, 2013.*

(Continued)

*Primary Examiner* — Khanh T Nguyen
(74) *Attorney, Agent, or Firm* — Osha Bergman Watanabe & Burton LLP

(57) ABSTRACT

The invention relates to an NVPF-based composition and the use thereof in the field of batteries as an electrochemically active material. The invention also relates to a conductive composition comprising said composition as well as to a method for obtaining said composition.

20 Claims, 2 Drawing Sheets

(52) U.S. Cl.
CPC ......... *H01M 4/5825* (2013.01); *H01M 4/623* (2013.01); *H01M 4/625* (2013.01); *H01M 10/054* (2013.01); *C01P 2002/77* (2013.01); *C01P 2002/82* (2013.01); *C01P 2004/03* (2013.01); *C01P 2004/51* (2013.01); *C01P 2004/61* (2013.01); *C01P 2006/11* (2013.01); *C01P 2006/12* (2013.01); *C01P 2006/40* (2013.01); *H01M 2004/021* (2013.01); *H01M 2004/028* (2013.01)

(58) Field of Classification Search
USPC .................................................. 429/112, 221
See application file for complete search history.

(56) References Cited

U.S. PATENT DOCUMENTS

2016/0126599 A1* 5/2016 Fukunaga ........... H01M 10/054 429/112
2018/0297847 A1 10/2018 Hall et al.

FOREIGN PATENT DOCUMENTS

| CN | 105655565 A | 6/2016 | |
|---|---|---|---|
| FR | 3042313 A1 | 4/2017 | |
| WO | WO 2017064189 A1 * | 4/2017 | ........... C01B 25/455 |
| WO | 2018229447 A1 | 2/2018 | |

OTHER PUBLICATIONS

Guo Biao et al: "Enhanced electrochemical performance of Na3V2(P04)2F3 for Na-ion batteries with nanostructure and carbon coating",Journal of Materials Science. Materials in Electronics, Chapman and Hall, London, GB,vol. 29, No. 19,Z3 juillet 2818 (2818-07-23), pp. 16325-16329, XP836591754,ISSN: 8957-4522, DOI:10.1087/510854-818-9722-8.

Zigeng Liu et al: Local Structure and Dynamics in the Na Ion Battery Positive Electrode Material Na 3 V 2 (PO 4 ) 2 F3 n, Chemistry of Materials, vol. 26, No. 8,22 avril 2814 (2014-84-22), pp. 2513-2521, XP855389788, ISSN: 8897-4756, DOI: 18. 1821/cm483728w.

* cited by examiner

Capacity (mA.h/g)

POSITIVE ELECTRODE COMPOSITION

The present application is a U.S. national phase entry under 35 U.S.C. § 371 of International Application No. PCT/EP2019/070549, filed on Jul. 30, 2019, which claims the priority of the French patent application No. 1857116 filed on Jul. 30, 2018. The entire contents of these applications are explicitly incorporated herein by this reference. In case of inconsistency between the text of the present application and the text of the French patent application which would affect the clarity of a term or of an expression, reference shall be made solely to the present application.

The present invention relates to an NVPF-based composition and to its use in the field of batteries as electrochemically active material. It also relates to a conductive composition comprising said composition and to the process which makes it possible to obtain said composition.

TECHNICAL BACKGROUND

The demand for lithium-ion batteries has increased in recent years with regard to their application in a wide variety of electronic devices, such as portable telephones and electric vehicles. In point of fact, lithium-based compounds are relatively expensive and natural lithium sources are unequally distributed over the planet and are not readily accessible as they are localized in a small number of countries. Alternatives to this element have thus been sought. To this end, sodium-ion batteries have been developed. This is because sodium is very abundant and distributed homogeneously, and is advantageously nontoxic and economically more advantageous.

However, the redox potential of the Na$^+$/Na couple is (−2.71 V vs SHE) and is thus greater than that of the Li$^+$/Li couple (−3.05 V vs SHE), for a triple molar mass. These specificities make it difficult to choose a host material. Recently, the material Na$_3$V$_2$(PO$_4$)$_2$F$_3$ (or NVPF) has proved to be a particularly advantageous electrochemically active material with regard to its electrochemical performance qualities.

FR 3042313 and WO 2017/064189 describe NVPF particles which may exhibit an average size of less than 25 μm, preferably of less than 10 μm, this size being determined by laser particle size analysis. This document does not specify the improved Dv10, Dv50 and Dv90 characteristics of the composition of the invention. CN 103594716 describes NVPF-based compositions without information on the Dv10, Dv50 and Dv90 characteristics.

CN 105655565 describes NVPF-based compositions exhibiting a tapped density which may exceed 1 g/cm$^3$. These compositions comprise sodium vanadium phosphate of formula Na$_3$V$_2$(PO$_4$)$_3$ as well as a conductive polymer, for example of polyaniline (PANI) type. There is no mention of the particle size distribution.

The Technical Problem

The volumetric energy density of an electrode represents the amount of energy which an electrode may store per unit of volume. It has to be maximized in order to limit the bulkiness of the batteries. This is all the truer since certain applications require a reduced bulkiness of the battery, for example when the battery is in the form of a button cell. In order to guarantee the extraction and the reinsertion of the sodium ions of the electrochemically active material, an electrode is formed from a conductive composition comprising the electrochemically active material, as well as a suitable proportion of electrochemically inactive materials, such as the binder or the conductive additive, and characterized by a degree of porosity. The conductive additive ensures electron percolation through the electrode. The binder ensures the adhesion to the current collector and the mechanical strength of the composite electrode. The porosity is for its part necessary for the ion percolation between the electrolyte and the active material. In order to maximize the volumetric capacity (expressed in this patent application in Ah/l), an attempt is made to limit the amount of electrochemically inactive materials as well as the porosity in the composite, without however compromising the extraction and the reinsertion of the sodium ions of the active material.

It is also sought for the electrochemically active material to be able to be easily formulated with the electrochemically inactive materials and for the conductive composition to be able to be easily coated and without leading to defects, such as, for example, "streaked" films.

As electrochemically active material, the composition of the invention is targeted at resolving this compromise.

FIGURES

THE INVENTION

Figure 1:
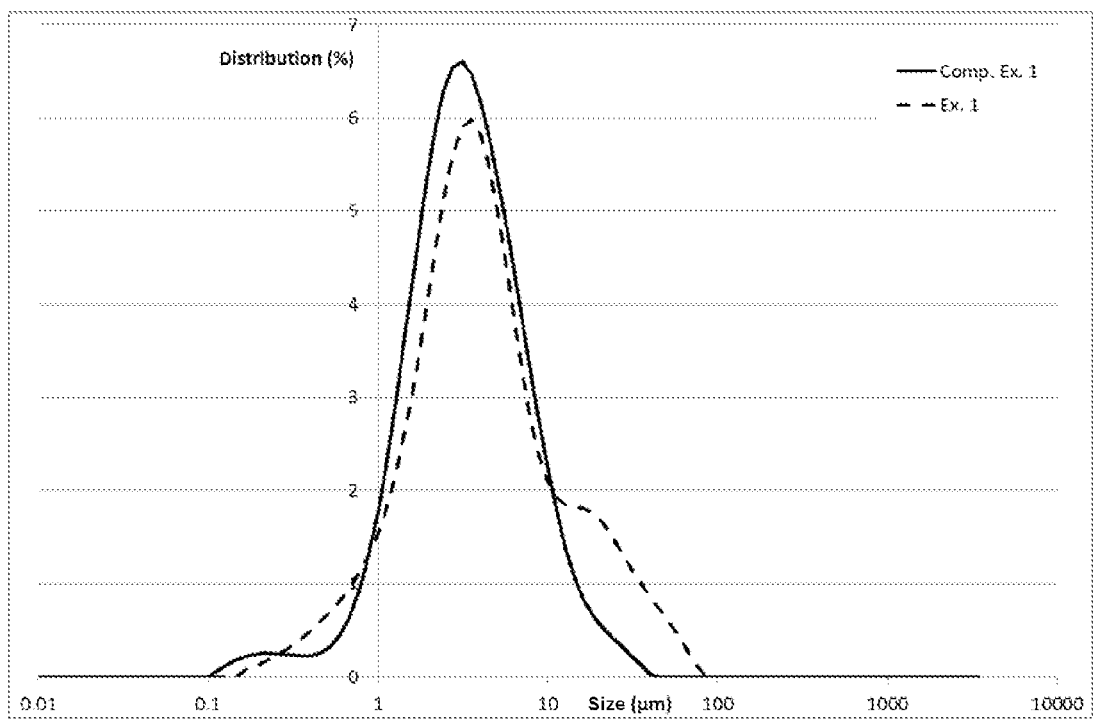
FIG. 1 represents the size distribution of the composition of example 1 (dotted line) and of the composition of comparative example 1 (solid line).
Figure 2:
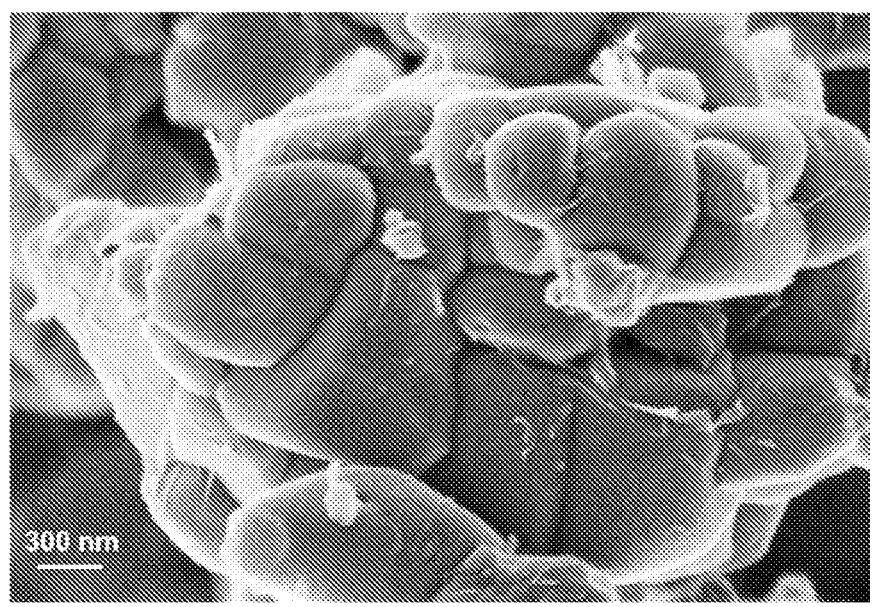
FIG. 2 represents an SEM image of the composition of example 1. It is noticed in this image that only NVPF particles are detected and that it is not possible to observe carbon-based particles.
Figure 3:
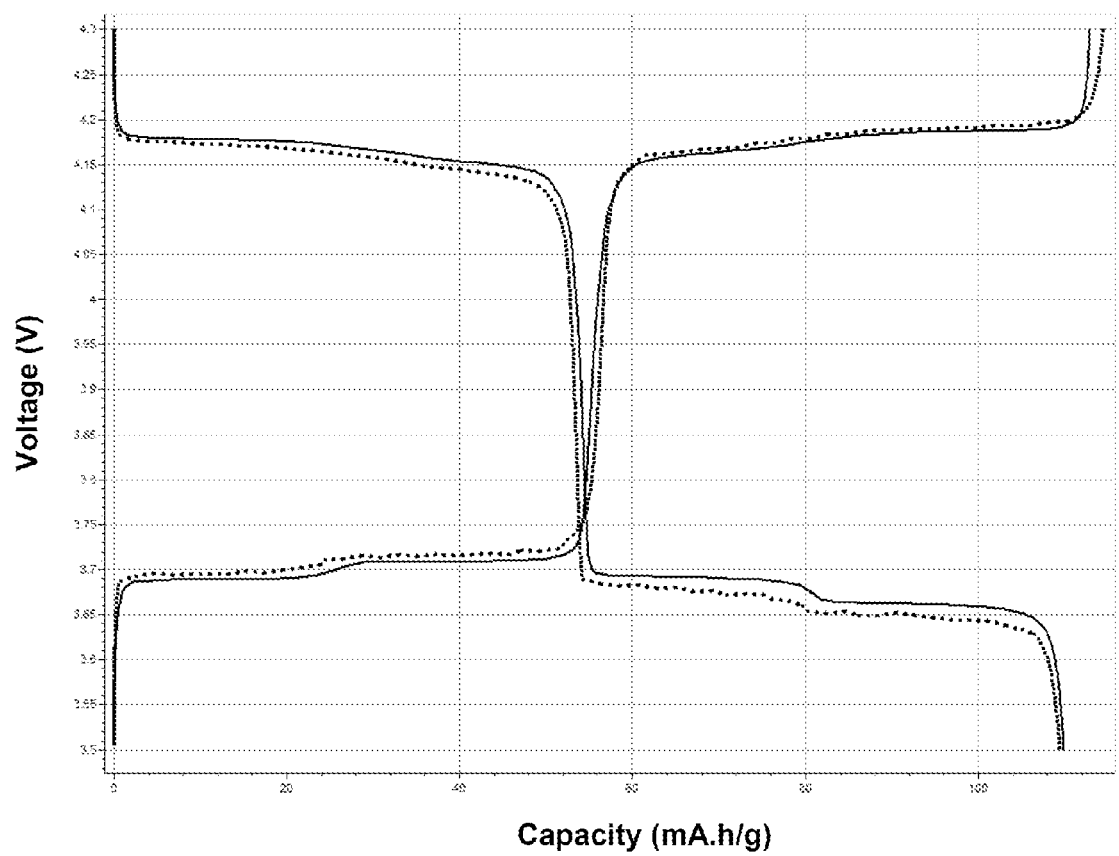
FIG. 3 represents the galvanostatic curves in potential with respect to the capacity of the composition of example 1 (dotted line) and of the composition of comparative example 1 (solid line)

The invention relates to a composition comprising particles of NVPF, which is optionally partially oxidized, as well as carbon in graphitized form, characterized by (1) a carbon content of between 1.0% and 3.5%, indeed even between 1.0% and 3.0%, this content being expressed by weight of the element carbon with respect to the total weight of the composition, (2) by a tapped density TD of greater than or equal to 0.9 g/ml, indeed even of greater than or equal to 1.0 g/ml, indeed even more of greater than or equal to 1.1 g/ml or 1.2 g/ml, and (3) by a particle size distribution by volume exhibiting the following characteristics:
Dv90≤25.0 μm, indeed even ≤20.0 μm;
Dv50 between 1.0 μm and 10.0 μm, more particularly between 1.0 μm and 7.0 μm, indeed even between 1.0 μm and 5.0 μm;
the distribution being obtained by laser diffraction from a dispersion of the composition in ethanol, in particular in anhydrous ethanol.

More details on the invention are now given below, including in the claims.

The composition of the invention comprises particles of NVPF, which is optionally partially oxidized. NVPF, which is optionally partially oxidized, is the predominant element of the composition. Its proportion by weight is greater than or equal to 97.0%, this proportion being expressed with respect to the total weight of the composition. This proportion may be between 97.0% and 99.0% by weight. The composition of the invention does not comprise Na$_3$V$_2$(PO$_4$)$_3$ or, if it contains it, its proportion by weight in the composition is at most 1.0%, indeed even at most 0.5%.

More particularly, the composition of the invention is constituted essentially of particles of NVPF, which is optionally partially oxidized, as well as carbon in graphitized form, characterized (1) by a carbon content of between 1.0% and 3.5%, indeed even between 1.0% and 3.0%, this content being expressed by weight of the element carbon with respect to the total weight of the composition, (2) by a tapped density TD of greater than or equal to 0.9 g/ml, indeed even of greater than or equal to 1.0 g/ml, indeed even more of greater than or equal to 1.1 g/ml or 1.2 g/ml, and (3) by a particle size distribution by volume exhibiting the following characteristics:

Dv90≤25.0 µm, indeed even ≤20.0 µm;
Dv50 between 1.0 µm and 10.0 µm, more particularly between 1.0 µm and 7.0 µm, indeed even between 1.0 µm and 5.0 µm;

the distribution being obtained by laser diffraction from a dispersion of the composition in ethanol, in particular in anhydrous ethanol.

NVPF is the compound with the molecular formula $Na_3V_2(PO_4)_2F_3$. In this compound, vanadium is present in the +III oxidation state. The NVPF may be partially oxidized. In this case, the product is characterized by the presence also of vanadium in the +IV oxidation state as well as by the partial replacement of fluorine atoms by oxygen atoms. The partially oxidized NVPF may be represented by the formula $Na_3V_2(PO_4)_2F_{3-x}O_x$, x being an integer between 0 and 0.5.

The optionally partially oxidized NVPF crystallizes in an orthorhombic unit cell of Amam space group. The unit cell parameter c may be greater than or equal to 10.686 angstroms, indeed even greater than or equal to 10.750 angstroms. It may be substantially equal to 10.750 angstroms. The unit cell parameter a may for its part be between 9.027 and 9.036 angstroms, preferably substantially equal to 9.029 angstroms. The unit cell parameter b may for its part be between 9.038 and 9.045 angstroms, preferably substantially equal to 9.044 angstroms. The unit cell volume V is for its part between 872.604 and 878.390 angstroms$^3$, preferably substantially equal to 878.000 angstroms$^3$.

For NVPF, the unit cell parameter c is between 10.741 and 10.754 angstroms. The unit cell parameter a is between 9.028 and 9.031 angstroms. The unit cell parameter b is between 9.043 and 9.045 angstroms. The unit cell volume V is for its part between 877.335 and 878.390 angstroms$^3$, preferably substantially equal to 878.000 angstroms$^3$.

The composition of the invention is also characterized by its carbon content. The latter is between 1.0% and 3.5%, indeed even between 1.0% and 3.0%, this content being expressed by weight of the element carbon with respect to the total weight of the composition. The carbon content is determined by microanalysis.

The composition comprises carbon in graphitized form. Carbon in graphitized form contributes to the electron conductivity at the surface of the NVPF particles. The presence of carbon in graphitized form in the composition may be demonstrated using Raman spectroscopy. More specifically, carbon in graphitized form may be demonstrated by Raman spectroscopy by the presence of a vibration band located between 1580 and 1600 cm$^{-1}$, more particularly centered around 1590 cm$^{-1}$. Carbon in graphitized form is obtained by high-temperature thermal decomposition of an oxygen-comprising hydrocarbon compound, as described below. The thermal decomposition also results in the formation of amorphous carbon.

The composition of the invention may exhibit a ratio R of less than or equal to 1.5, preferably of less than or equal to 1.0, indeed even of less than or equal to 0.9, in which:

R denotes the arithmetic mean of the ratio $I_D/I_G$ calculated over at least 6 measurements carried out at various points of a sample of the composition;
$I_D$ denotes the intensity of the Raman vibration band centered around 1340 cm$^{-1}$;
$I_G$ denotes the intensity of the Raman vibration band centered around 1590 cm$^{-1}$.

The vibration band around 1340 cm$^{-1}$ is attributable to amorphous (or disordered) carbon. This band is generally located between 1330 and 1360 cm$^{-1}$. The vibration band around 1590 cm$^{-1}$ is attributable to graphitized carbon. This band is generally located between 1580 and 1600 cm$^{-1}$.

The composition of the invention furthermore exhibits a tapped density TD which is greater than or equal to 0.9 g/ml, indeed even greater than or equal to 1.0 g/ml, indeed even more greater than or equal to equal to 1.1 g/ml or 1.2 g/ml. The tapped density is measured in a known way using a powder tapping device.

The following method for determination of the tapped density may be applied:

i) a 25 ml graduated measuring cylinder, preferably of class A+ according to the standard ISO 6706, is filled with the composition, the initial volume Vi of this composition being approximately 20 ml;
ii) the test specimen is subsequently subjected to a series of 3000 blows;
iii) the final volume Vf of the composition is then measured.

The tapped density is then defined by:

$$\text{TD (in g/ml)} = \text{weight of the composition/volume } Vf$$

Thus, the invention as defined in the present patent application, including in the claims, relates in particular to a composition comprising particles of NVPF, which is optionally partially oxidized, as well as carbon in graphitized form, characterized by (1) a carbon content of between 1.0% and 3.5%, indeed even between 1.0% and 3.0%, this content being expressed by weight of the element carbon with respect to the total weight of the composition, (2) by a tapped density TD of greater than or equal to 0.9 g/ml, indeed even of greater than or equal to 1.0 g/ml, indeed even more of greater than or equal to 1.1 g/ml or 1.2 g/ml, and (3) by a particle size distribution by volume exhibiting the following characteristics:

Dv90≤25.0 µm, indeed even ≤20.0 µm;
Dv50 between 1.0 µm and 10.0 µm, more particularly between 1.0 µm and 7.0 µm, indeed even between 1.0 µm and 5.0 µm;

the distribution being obtained by laser diffraction from a dispersion of the composition in ethanol, in particular in anhydrous ethanol,
and the tapped density being determined by the following method consisting in:
i) filling a 25 ml graduated measuring cylinder, preferably of class A+ according to the standard ISO 6706, with the composition, the initial volume Vi of this composition being approximately 20 ml;
ii) the test specimen is subsequently subjected to a series of 3000 blows;
iii) the final volume Vf of the composition is then measured, the tapped density then being defined by the following relationship:

$$\text{TD (in g/ml)} = \text{weight of the composition/volume } Vf.$$

Generally, a blow consists in lifting the test specimen by a certain height and in letting it fall. This height may be, for example, 0.5 inch.

It is generally considered that, after 3000 blows, the volume of the composition no longer changes. After the series of 3000 blows, it will be possible to continue to subject the test specimen to another series of blows in order to confirm that the absolute value of the difference in volume between the two consecutive series of blows is less than 2.0% (that is to say $(|V_{first\ series}-V_{following\ series}|)/V_{first\ series} \times 100 < 2.0\%$). Should, however, this difference be greater than or equal to 2.0%, the procedure is continued with other series of blows until this difference is less than 2.0%. The volume Vf to be taken into account is that for which the absolute value of the difference in volume between the two consecutive series of blows is less than 2.0%.

The method of determination of the tapped density may be found more particularly in the examples section.

The tapped density is generally less than or equal to 2.0 g/ml, indeed even 1.8 g/ml, indeed even more 1.5 g/ml.

The composition of the invention also exhibits a particular particle size distribution. The latter is measured by laser diffraction from a dispersion of the composition in ethanol, in particular in anhydrous ethanol. Laser diffraction makes it possible to determine the particle size distributions of particles by measuring the angular variation in the intensity of light scattered when a laser beam passes through a sample of dispersed particles. Large particles scatter light at small angles with respect to the laser beam and small particles scatter light at greater angles. The characteristics of the distribution, such as Dv10, Dv50 or Dv90, which are given in the present patent application are obtained from the distribution by volume and not by number. The parameters Dv10, Dv50 and Dv90 have the usual meanings in the field of measurements by laser diffraction. See, for example, https://www.horiba.com/fileadmin/uploads/Scientific/Documents/PSA/PSA_Guide book.pdf.

Dvx denotes the value which is determined with regard to the distribution by volume of the sizes of the particles for which x % of the particles have a size less than or equal to this value Dvx. Thus, for example, with respect to Dv10, 10% of the particles have a size which is less than Dv10. For example again, with respect to Dv90, 90% of the particles have a size which is less than Dv90. Dv50 corresponds to the median value of the distribution by volume.

Thus, for the composition of the invention, Dv90 is less than or equal to 25.0 μm, indeed even less than or equal to 20.0 μm. Dv90 may be between 5.0 μm and 25.0 μm, indeed even between 5.0 μm and 20.0 μm.

Moreover, Dv50 is between 1.0 μm and 10.0 μm, more particularly between 1.0 μm and 7.0 μm, indeed even between 1.0 μm and 5.0 μm.

Moreover, Dv10 may be greater than or equal to 0.50 μm, indeed even greater than or equal to 1.0 μm. The distribution is furthermore narrow, which is characterized by a coefficient of dispersion σ/m of at most 10.0. This coefficient is determined by the following formula: σ/m=(Dv90−Dv10)/Dv50. σ/m may instead be between 2.0 and 8.0, more particularly between 2.5 and 6.0, indeed even between 2.5 and 5.0.

The particle size distribution may comprise two populations: a first population, which is predominant, centered at a value between 1.0 μm and 4.0 μm, preferentially between 2.0 μm and 3.5 μm; and a second population, which is minor, centered at a value between 10.0 μm and 25.0 μm, preferentially between 15.0 μm and 21.0 μm.

The first population is predominant and the second population is minor. This may be demonstrated in particular by the fact that the ratio of the intensity of the peak of the first population to the intensity of the peak of the second population is greater than or equal to 3.0.

The expression "population centered at a given value" means the presence over the deconvoluted distribution of a peak, the maximum of which is located at this given value. For the deconvolution, the populations may be considered to be Gaussian. In FIG. 1, it is possible to distinguish, over the size distribution, the presence of this double population.

In addition, the proportion of the particles with sizes of greater than or equal to 12.0 μm (denoted $P_{12\ \mu m}$) may more particularly be greater than or equal to 5.0%, indeed even greater than or equal to 10.0%, indeed even more greater than or equal to 15.0%. $P_{12\ \mu m}$ is determined from the size distribution by volume.

The composition of the invention may exhibit a BET specific surface at least equal to 2 $m^2/g$, indeed even greater than or equal to 10 $m^2/g$. This specific surface may be between 2 and 15 $m^2/g$, indeed even between 10 and 15 $m^2/g$. The BET surface refers to the specific surface obtained by adsorption/desorption of nitrogen according to the well-known Brunauer-Emmett-Teller method. The method for determination of the BET specific surface may be found in the examples.

The composition of the invention may be prepared by the process comprising the following steps:

a) a mixture formed of $V_2O_5$ and $NH_4H_2PO_4$, these two reactants being both in the solid state, as well as water, the initial proportion of which is between 75% and 150%, this proportion being calculated by weight with respect to the combination of the two reactants $V_2O_5$ and $NH_4H_2PO_4$, is stirred;

b) the wet paste resulting from the preceding step is calcined at a temperature of at least 700° C. in order to result in the formation of $VPO_4$;

c) the $VPO_4$ obtained in step b) is mixed with sodium fluoride and an oxygen-comprising hydrocarbon compound, which thermally decomposes to give carbon partially in graphitized form, and the mixture thus obtained is calcined at a temperature of at least 700° C.;

d) the product obtained in step c) is deagglomerated in order to result in the composition of the invention.

In step a), a mixture comprising $V_2O_5$, $NH_4H_2PO_4$ and water is formed. The two compounds $V_2O_5$ and $NH_4H_2PO_4$ are preferably present in the form of powders. It is possible to use powders, the particles of which exhibit a diameter Dv50 of at most 100 μm, indeed even of at most 50 μm. Dv50 is the median diameter obtained from a size distribution by volume determined by a laser particle sizer. It is preferable to use a mixture for which the two starting reactants have been intimately mixed.

To obtain an NVPF of good purity, it is preferable to use a mixture close to the stoichiometry of the reaction (I). Use may be made, for example, of a mixture comprising $V_2O_5$ and $NH_4H_2PO_4$ in an initial V/P molar ratio of between 0.9 and 1.1, indeed even between 0.95 and 1.05.

The mixture also comprises water, the initial proportion by weight of which is between 75% and 150%, this proportion being calculated by weight with respect to the combination of the two reactants $V_2O_5$ and $NH_4H_2PO_4$. This proportion is that of the water which is present in the mixture at the start of step a).

The preparation of the mixture is based on the mixing of $V_2O_5$, of $NH_4H_2PO_4$ and of water in any order. It is possible, for example, to intimately mix the two powders, to add water to the mixture of two powders thus obtained and to subsequently mix the combination. This mixing may be carried out in a mixing means suitable for the rheology of the mixture.

The reaction between the two reactants is written:

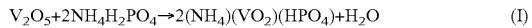

$$V_2O_5 + 2NH_4H_2PO_4 \rightarrow 2(NH_4)(VO_2)(HPO_4) + H_2O \quad (I)$$

The mixture described above is stirred with any mixing means suitable for viscous media, such as, for example, a propeller stirrer, an inclined blade stirrer or a kneader. This is because it is observed that, when the reaction progresses, the viscosity of the mixture increases to result in a viscous paste. On the laboratory scale, the Controlab L0031.2 kneader might be used.

The stirring may be carried out at a temperature which does not have to be high. Thus, this temperature may be at most 100° C., indeed even at most 60° C., indeed even at most 30° C. When the initial temperature at which the stirring begins is less than 50° C., indeed even less than 30° C., the reaction is longer, which makes possible better control of the viscosity of the mixture (which tends to increase with the progression of the reaction) and also prevents the reaction mixture from setting solid. The duration of the reaction depends on the amount of water initially present in the mixture, on the state of division of the solids used at the start as well as on the physical form of the mixture. This duration is generally between 2 h and 60 h. It is possible to monitor the progress of the reaction (I) according to several methods. A first visual method consists in dispersing in 5 ml of deionized water, under ultrasound, 15 mg of a sample withdrawn during the reaction. When starting reactants remain, the mixture thus formed exists in the form of an opaque dispersion, whereas, when the progression is well advanced, the mixture thus formed exists in the form of a translucent solution bright yellow in color. More quantitatively, according to a second method, it is possible to monitor the chemical reaction by analyzing, using an x-ray diffractometer (XRD), the samples withdrawn during the reaction.

On conclusion of step a), a wet paste is obtained.

In step b), the wet paste resulting from the preceding step is calcined at a temperature of at least 700° C., indeed even of at least 800° C., to result in the formation of $VPO_4$. This temperature is preferably between 700° C. and 1000° C. in order to develop the crystallinity of the product ($VPO_4$ exhibiting an orthorhombic structure) while avoiding the decomposition of the $VPO_4$.

In step c), the $VPO_4$ obtained in step b) is mixed with the stoichiometric amount of sodium fluoride and an oxygen-comprising hydrocarbon compound, source of the carbon present in the composition, and the mixture thus obtained is calcined at a temperature of at least 700° C., indeed even of at least 800° C. It is advantageous to use a mixture in which the solids are intimately mixed. In order to obtain a thoroughly intimate mixture, it is possible to use a $VPO_4$ which has been ground and/or sieved beforehand. For example, use may be made of a ground and sieved $VPO_4$ which exhibits a Dv50 of between 20 and 60 μm and a Dv90 between 80 and 100 μm, the distribution itself being determined from a suspension in anhydrous ethanol.

The oxygen-comprising hydrocarbon compound results, by thermal decomposition, in the carbon, in particular in graphitized form, which is present in the composition. This compound may, for example, be a sugar, such as, for example, glucose, saccharose, sucrose or fructose, or a carbohydrate, such as, for example, starch or a cellulose derivative. More preferably, it is a cellulose derivative and more particularly still microcrystalline cellulose. The source of carbon present in the composition is important because it is liable to have an influence on the tapped density and on the electrochemical properties (cf. comparative example 1). The proportion of the oxygen-comprising hydrocarbon compound in the mixture based on $VPO_4$ and on NaF may be between 0.5% and 15.0% by weight, indeed even between 8.0% and 12.0%, this proportion being calculated with respect to the combination of the $VPO_4$ and NaF mixture.

During step b) or step c), it is advisable to minimize contact of the reaction mixture with oxygen. In order to do this, the calcination may be carried out in a confined environment and/or the presence of oxygen may be limited by the introduction, into the vessel in which the calcination takes place, of an inert gas, such as nitrogen or argon. To do this, it may also be advantageous to carry out the calcination in a closed vessel, formed of a dense and not very porous material. On the laboratory scale, an SiC crucible closed by a lid in the same material was thus used.

In step d), the product obtained in step c) is deagglomerated. A ball mill or an air jet mill may be used for this. Ball milling consists in rotating around its horizontal axis a tank partially filled with the product to be ground and with grinding balls. Setting in rotation at a limited speed induces the grinding of the product via the impacts between the product and the balls set in rotation. The critical parameters for controlling the final particle size of the product are the degree of filling of the tank, generally less than % of the volume of the tank; the charging ratio by weight of the product to be ground to the balls, which may be between 1:4 and 1:15, preferentially between 1:4 and 1:10; the nature of the grinding balls, which may be made of zirconia, yttria-stabilized zirconia or alumina, for example, reflecting different hardnesses of the grinding medium; the size of the grinding balls, generally between 0.5 mm and 5 cm, preferentially between 1 and 2 mm; the speed of rotation of the tank, generally less than 100 rpm, preferentially less than 80 rpm; and the grinding time, which may vary between 15 minutes and 4 hours, preferentially between 30 minutes and 2 hours.

With regard to the air jet milling, it consists in entraining the product to be ground in a flow of air at high speed so as to create impacts between particles making it possible to reduce their size. More details on this technique may be found at the address: https://www.hosokawa-alpine.com/powder-particle-processing/machines/jet-mills/afg-flu-idised-bed-opposed-jet-mill/. The feed rate of the product to be ground into the grinding chamber is adjusted, for example by means of a metering screw, in order to constitute a steady-state fluidized bed. A selector is placed at the outlet of the grinding chamber so as to recover only sufficiently fine particles. The critical parameters for controlling the final particle size of the product are the pressure of the air introduced into the grinding chamber and the speed of rotation of the selector. An example of an air mill is the AFG-100 mill sold by Hosokawa. The conditions described in example 1 may be used.

The progression of the deagglomeration may be monitored by withdrawing a sample of the product over time so as to determine the size distribution in anhydrous ethanol. This makes it possible to determine if the conditions of the deagglomeration are appropriate for obtaining the desired characteristics of tapped density and of size distribution. It is generally advisable to start to deagglomerate with the mildest deagglomeration conditions. If the characteristics of tapped density and of size distribution are not obtained, it is then possible to continue the deagglomeration with severer conditions.

The composition of the invention may be prepared more particularly according to the procedure described in example 1.

The composition of the invention may be used as electrochemically active material of electrodes for sodium batteries or for sodium-ion batteries. The invention also relates to an electrode comprising a conductive composition comprising the composition of the invention, at least one electron-conducting material and optionally a binder. The proportion of the composition of the invention in the conductive composition is generally greater than 40.0% by weight, this proportion being with respect to the total weight of the conductive composition. This proportion may be between 40.0% and 80.0%. The proportion of the conductive material is generally less than 50.0% by weight, this proportion being with respect to the total weight of the conductive composition. This proportion may be between 8.0% and 30.0%. More particularly, a conductive composition may comprise from 75.0% to 85.0% by weight of the composition of the invention, from 5.0% to 15.0% by weight of the conductive material and from 5.0% to 15.0% by weight of binder.

The electron-conducting material may be chosen from carbon fibers, carbon black, carbon nanotubes, graphene and their analogs. An example of conductive material is Super P carbon, for example H 30253, sold by Alfa Aesar. The binder may advantageously be a polymer. The binder may advantageously be chosen from polytetrafluoroethylene, polyvinylidene fluoride or a copolymer of vinylidene fluoride and of at least one comonomer, such as, for example, hexafluoropropylene, polymers derived from carboxymethylcellulose, polysaccharides and latexes, in particular of styrene/butadiene rubber type. The binder is preferably a copolymer of vinylidene fluoride and of at least one comonomer, such as, for example, hexafluoropropylene. It may, for example, be the Solef 5130 grade sold by Solvay.

The conductive composition may be prepared by mixing together the ingredients which constitute it in the presence of a polar solvent, such as N-methylpyrrolidone. When the viscosity of the mixture is high, a kneader suitable for high viscosities may be used. In the case of a polymeric binder, it is possible, for example, to first dissolve the binder in the NMP, to subsequently add the conductive material with stirring, then the composition according to the invention. The mixture may subsequently be deposited on an aluminum sheet and then the NMP may be evaporated, for example using heating.

The electrode of the invention may be used as positive electrode of a sodium generator. Advantageously, it is favored for use as positive electrode for a sodium or sodium-ion storage battery.

EXAMPLES

Determination of the Carbon Content

The carbon content is measured by microanalysis with a Horiba EMIA 320 V2 brand carbon/sulfur analyzer.

Determination of the Particle Size Distribution

The particle size distribution is measured by laser diffraction on a suspension of the particles in anhydrous ethanol. A Malvern Mastersizer 3000 appliance equipped with the Hydro SV module is used. The tank of the appliance is filled with absolute ethanol (refractive index for ethanol of 1.360) and stirred at 1800 rpm. A few milligrams of powder are then introduced directly into the tank so as to have an obscuration of between 5% and 15%. The optical model used is Fraunhofer.

The measurement sequence will consist of 5 successive measurements on the sample. The acquisition periods are defined as follows:

duration of the background noise measurement (red): 10.00 s;

duration of the sample measurement (red): 10.00 s;

carrying out the measurement in blue light: yes;

duration of the background noise measurement (blue): 10.00 s;

duration of the sample measurement (blue): 10.00 s.

Determination of the Tapped Density

A 25 ml (±0.2 ml at 20° C.) class A+ standardized graduated measuring cylinder is used and filled with exactly approximately 20 ml of the loose composition. 3000 blows are imposed before reading the final volume occupied by the tapped powder. The tapped density is then determined by the following formula:

TD (in g/ml)=weight of composition/final volume determined

Determination of the BET Specific Surface

The BET specific surface is measured according to the "single-point" Brunauer-Emmett-Teller method on a Mountech Macsorb appliance. This instrument measures the specific surface by the gas stream method which involves the continuous flow of an adsorbent and inert gas mixture over the sample at atmospheric pressure. The gas mixture used is 70% helium and 30% nitrogen, i.e. a relative pressure of 0.3.

The samples are initially degassed at 200° C. for 2 hours under a flow of nitrogen before placing on the carousel of the measurement device. During the analysis, an additional degassing at 200° C. for 5 min is carried out by the appliance before analysis. During the analysis, the adsorption and desorption phases are recorded. The specific surface measurements are then calculated on the desorption phase. For each sample, the sensor is calibrated by injection of a known volume of pure nitrogen. The weight of sample used for this measurement corresponds to the weight of sample after degassing.

Determination of the Powder X-Ray Diffraction Diagram

Powder X-ray diffractograms were obtained in Bragg-Brentano geometry, with variable slits. Acquisition is carried out between $2\theta=5°$ and $2\theta=90°$, on an X Pert Pro MPD assembly from Panalytical, equipped with a tube X-ray source with copper anticathode, at a voltage of 40 kV and a current of 30 mA. The detector is an XCelerator linear detector with an arc length of 2.122°. The PHD interval is the interval by default of 37-80%. A nickel filter placed in front of the detector makes it possible to attenuate the diffraction by the K beta line of copper. The exposure time is 40 seconds in steps of 0.017°. The phase analysis is carried out on High Score Plus software equipped with the latest version of the ICDD PDF4+ database. The goniometer is checked periodically using a polycrystalline silicon standard.

Recording and Processing of the Raman Spectroscopy Spectra

The spectra were recorded on a Horiba-XploRA PLUS spectrometer between 50 and 2600 $cm^{-1}$ with a 532 nm laser (100 mW nominal power), a 100× objective, a 1200 rpm grating, a 1% filter, a 100 μm confocal hole and a 2×120 s acquisition time. The software used for the acquisitions and the processing operations is the Labspec version 6-4-4-16 from Horiba. In order to carry out the acquisition, the sample is deposited in the powder form on a calcium fluoride window, itself deposited on a glass slide covered with aluminum. Focusing is carried out on the sample with a 100× objective. After acquisition, the spectra are smoothed and then deconvoluted into two Gaussian-shaped contributions: one centered around 1340 $cm^{-1}$ and the other centered around 1580 $cm^{-1}$. The intensities are determined from the baseline drawn between two points on the spectrum located at 700 $cm^{-1}$ and at 2000 $cm^{-1}$.

Preparation of the Positive Electrodes from the Composition of the Invention

The conductive compositions (or electrode inks) are prepared by mixing the NVPF-based compositions with carbon black (Super P carbon) and a fluoropolymer (PVDF Solef 5130) in respective proportions by weight of 80:10:10 in the N-methyl-2-pyrrolidone solvent in order to obtain a viscous ink. This ink is subsequently deposited using a film applicator with a thickness of 150 μm on an aluminum sheet with a thickness of 20 μm, then dried at 90° C. until the solvent has completely evaporated. Electrode disks with a diameter of 14 mm are cut out from the dry film, then pressed at ambient temperature using a uniaxial press with a pressure of 1.3 tonnes/$cm^2$ for 1 minute. The disks are subsequently dried under low vacuum at 120° C. for 10 h before being transferred into a glove box under an argon atmosphere.

It could be observed that the compositions of the invention were easily formulated and did not result in "streaked" films.

Assembly of Electrochemical Cells of "Button Cell" Type

The NVPF electrodes are assembled in a half-cell configuration, facing a metallic sodium negative electrode, in a 2032 (20 mm in diameter by 3.2 mm in thickness) button cell geometry. The electrolyte used is composed of a mixture in equal volumes of ethylene carbonate and of dimethyl carbonate containing one mole per liter of dissolved sodium hexafluorophosphate salt, to which mixture 1% by weight of fluoroethylene carbonate is added. The button cell consists of the NVPF positive electrode, of the metallic sodium negative electrode, of 100 μl of electrolyte, of a stainless steel current collector with a thickness of 1 mm, of a ring-shaped spring with a thickness of 1.4 mm, of a fiberglass separator with a thickness of 16 mm and of the rigid casing of the cell (two hollow pieces interlocking with a seal). A thin flat layer of metallic sodium is deposited on the current collector, the weight of sodium being sufficient not to be limiting in the system. The separator is impregnated with electrolyte and placed between the two facing electrodes. These elements are kept under pressure by the spring inside the rigid casing, which is subsequently crimped in order to guarantee the leaktightness of the system.

Electrochemical Tests

The cells assembled from NVPF electrodes are electrochemically tested under galvanostatic conditions, between 3.5 V and 4.3 V vs $Na^+$/Na, starting with the charge (positive current). The current used in charge and in discharge is expressed in C-rate. The C-rate is the measure of the speed at which a battery is charged or discharged. It is defined as the applied current divided by the theoretical current necessary to deliver the theoretical capacity of the battery in one hour. The electrochemical tests are carried out at a C-rate of C/10, corresponding to a theoretical charge or theoretical discharge in 10 hours.

The electrochemical tests make it possible to determine the reversible charging capacity of the NVPF electrodes. This capacity is reported by volume of the composition and is expressed in Ah/l (the volume of the composition is calculated from the weight of composition used and the tapped density TD).

Example 1: Preparation of the NVPF-Based Compositions According to the Invention First of all, stoichiometric amounts of $V_2O_5$ and $NH_4H_2PO_4$ are mixed in the presence of 100% by weight of water in a kneader of Controlab L0031.2 type. The proportion of water this proportion is calculated by weight with respect to the combination of the two reactants $V_2O_5$ and $NH_4H_2PO_4$. At the end of approximately 2 hours, the mixture thickens and a yellow-colored paste formed of $NH_4VO_2HPO_4$ (presence confirmed by XRD) and of water is obtained. This wet paste is placed in a well-confined environment. To do this, the paste is poured into a SiC crucible closed by a SiC lid. The paste is subsequently calcined at 800° C. for 3 hours with a temperature rise gradient of 5.5° C./min.

The $VPO_4$ which results from the calcination is friable and consists of pieces of between 1 mm and 5 cm. This product is ground using a jar mill for approximately 2 hours at a speed of rotation of 60 rpm. Polyethylene jars with a diameter of 20 cm and a slightly ovoid shape are used, which jars make it possible to charge the product to be ground with yttria-stabilized zirconia balls with a diameter of 20 mm. The charging ratio may be 1 kg of $VPO_4$ for a charge of 4 kg of balls. The $VPO_4$ thus ground is extracted from the jars, separated from the balls and sieved at 500 μm using a vibrating sieve which may have a vibrational amplitude of between 0.5 and 1.6. The $VPO_4$ sieved at 500 μm represents a fraction of between 95% and 98% of the total weight of $VPO_4$ ground. The product thus ground and sieved exhibits a particle size, the Dv50 of which is between 20 and 60 μm and the Dv90 of which is between 80 and 100 μm.

The $VPO_4$ thus obtained is mixed with a stoichiometric amount of NaF and 10% by weight of microcrystalline cellulose, with respect to the total weight of $VPO_4$+NaF (Sigma-Aldrich). The mixture of the solids is homogenized beforehand in a polyethylene jar filled with yttria-stabilized zirconia balls (balls of 5 mm and 20 mm in a ratio by weight of 1 (5 mm) to 4 (20 mm), ratio by weight [$VPO_4$+NaF+cellulose] mixture:balls=1:3) and rotated around its axis of symmetry for approximately 2-3 hours. The $VPO_4$ was ground and sieved in order to retain only the grains smaller than 500 μm in size.

The intimate mixture of the powders is subsequently calcined at 800° C. for 3 hours with a temperature rise gradient of 5.5° C./min. Generally, the same conditions are applied as during the first calcination to obtain $VPO_4$. The powder should be well confined during the calcination. The NVPF finally obtained is pure according to XRD.

The NVPF which is obtained is finally deagglomerated in order to obtain the desired particle size distribution. For example, it is possible to carry out a ball milling or an air jet milling. For the air jet milling, an air mill of AFG-100 reference sold by Hosokawa was used. The NVPF is introduced into the grinding chamber using a metering screw. The feed rate of the grinding chamber is adjusted in order to be placed under "steady state" conditions of the fluidized bed thus formed. The pressurized air is introduced into the grinding chamber using nozzles with a diameter of 2 mm at a pressure of 5.5 bars. The finest particles rise into the top part of the grinding chamber. A selector, the rotation of which is between 3000 and 5000 rpm, makes it possible to recover the deagglomerated product.

Comparative Example 1

The composition of this example was prepared according to a process similar to the process of the preceding example, except that:
- the mixing of $V_2O_5$ and $NH_4H_2PO_4$ is carried out without addition of water;
- carbon black was added during the first calcination in order to overcome a drawback of confinement of the powder (a crucible and a lid made of alumina are used).

It could be observed in the microscopy images that the carbon particles were still visible in certain places, this being the case even after the calcination. In addition, the composition thus prepared exhibits a lower density by volume than that of the compositions according to the invention.

$I_D$ denotes an intensity of the Raman vibration band centered around 1340 $cm^{-1}$;

$I_G$ denotes an intensity of the Raman vibration band centered around 1590 $cm^{-1}$.

6. The composition as claimed in claim 1, wherein:
Dv90 is less than or equal to 25.0 µm; or
Dv90 is less than or equal to 20.0 µm; or
Dv90 is between 5.0 µm and 25.0 µm; or
Dv90 is between 5.0 µm and 20.0 µm.

7. The composition as claimed in claim 1, wherein Dv50 is between 1.0 µm and 5.0 µm.

8. The composition as claimed in claim 1, wherein Dv10 is greater than or equal to 0.50 µm.

9. The composition as claimed in claim 1, wherein the particle size distribution by volume is such that a coefficient of dispersion σ/m, defined by the relationship σ/m=(Dv90−Dv10)/Dv50, is at most 10.0, wherein Dv90, Dv50 and Dv10 are obtained by laser diffraction from a dispersion of the composition in ethanol.

10. The composition as claimed in claim 1, wherein the particle size distribution comprises two populations: a first population, which is predominant, centered at a value between 1.0 µm and 4.0 µm; and a second population, which is minor, centered at a value between 10.0 µm and 25.0 µm.

11. The composition as claimed in claim 10, wherein the particle size distribution is such that a ratio of the intensity of the peak of the first population to the intensity of the peak of the second population is greater than or equal to 3.0.

12. The composition as claimed in claim 1, wherein the particle size distribution is such that a proportion of particles with sizes of greater than 12.0 µm, denoted $P_{12\,µm}$, and determined from the size distribution by volume obtained by laser diffraction from a dispersion of the composition in ethanol, is greater than or equal to 5.0%.

13. The composition as claimed in claim 1, exhibiting a BET specific surface at least equal to 2 $m^2/g$.

14. The composition as claimed in claim 1, wherein the tapped density is less than or equal to 2.0 g/ml.

15. A process for the preparation of the composition as claimed in claim 1, the process comprising the following steps:
a) stirring a mixture formed of $V_2O_5$ and $NH_4H_2PO_4$, these two reactants being both in the solid state, as well as water, wherein a proportion of water at the start of step a) is between 75% and 150% by weight with respect to the combination of the two reactants $V_2O_5$ and $NH_4H_2PO_4$;

TABLE I

| | XRD | | | | | | | | | | Raman spectroscopy | | | |
|---|---|---|---|---|---|---|---|---|---|---|---|---|---|---|
| | unit cell | | Size distribution | | | | | | | | position of | | | |
| Ex. | parameter c (A) | volume (A3) | Dv10 (µm) | Dv50 (µm) | Dv90 (µm) | $P_{12µm}$ (%) | σ/m | BET ($m^2/g$) | TD (g/ml) | % C | the D and G bands ($cm^{-1}$) | | R = $I_D/I_G$ | Capacity (Ah/l) |
| 1 | 10.752 | 877.985 | 1.2 | 4.0 | 20.7 | 15.9 | 4.8 | 10.2 | 1.2 | 2.4 | 1344 | 1594 | 0.90 | 130 |
| 2 | 10.751 | 877.696 | 1.2 | 3.8 | 15.6 | 12.0 | 3.8 | 10.6 | 1.1 | 2.3 | | | | 132 |
| 3 | 10.750 | 877.479 | 1.1 | 3.6 | 12.5 | 9.0 | 3.2 | 10.5 | 1.1 | 2.3 | 1345 | 1597 | 0.91 | 119 |
| 4 | 10.751 | 877.791 | 0.78 | 1.8 | 5.5 | 5.9 | 2.6 | 11.3 | 1.4 | 2.4 | | | | |
| 5 | 10.752 | 877.964 | 0.90 | 2.1 | 7.0 | 5.0 | 2.9 | | 1.3 | | | | | 154 |
| 6 | 10.749 | 877.337 | 1.71 | 6.81 | 21.97 | 16.8 | 3.0 | | 1.1 | 2.2 | | | | 125 |
| 7 | 10.751 | 877.583 | 1.56 | 6.47 | 18.21 | 13.3 | 2.6 | | 1.1 | 2.3 | | | | 122 |
| Comp. 1 | 10.753 | 878.353 | 1.0 | 3.5 | 10.0 | 4.8 | 2.6 | 14.0 | 0.79 | 6.7 | 1342 | 1587 | 0.93 | 90 | conditions used: the compositions of ex. 1 to 3 were obtained by an air jet milling (resp. with a speed of the selector of 3000, 4000 and 5000 rpm); the compositions of ex. 4 and 5 were obtained using a ball mill
TD: the tapped density of the composition of the invention was measured with a VanKel 50-100 Serial #5-1582-0699 automatic appliance.

The invention claimed is:

1. A composition comprising particles of NVPF of molecular formula $Na_3V_2(PO_4)_2F_3$, which is optionally partially oxidized and which crystallizes in an orthorhombic unit cell of Amam space group, as well as carbon in graphitized form, characterized by (1) a carbon content of between 1.0% and 3.5%, this content being expressed by weight of the element carbon with respect to the total weight of the composition, (2) by a tapped density TD of greater than or equal to 0.9 g/ml, and (3) by a particle size distribution by volume exhibiting the following characteristics:
Dv90≤25.0 µm
Dv50 of between 1.0 µm and 10.0 µm
the distribution being obtained by laser diffraction from a dispersion of the composition in ethanol, in particular in anhydrous ethanol.

2. The composition as claimed in claim 1, wherein a proportion by weight of NVPF expressed with respect to a total weight of the composition, is between 97.0% and 99.0% by weight.

3. The composition as claimed in claim 1, wherein a unit cell parameter c is greater than or equal to 10.686 angstroms.

4. The composition as claimed in claim 1, wherein a unit cell volume V is between 872.604 and 878.390 $angstroms^3$.

5. The composition as claimed in claim 1, exhibiting Raman spectra presenting a ratio R of less than or equal to 1.5, wherein:
R denotes an arithmetic mean of the ratio $I_D/I_G$ calculated over at least 6 measurements carried out at various points of a sample of the composition;

b) calcining a wet paste resulting from the preceding step at a temperature of at least 700° C. in order to result in the formation of $VPO_4$;

c) mixing the $VPO_4$ obtained in step b) with sodium fluoride and an oxygen-comprising hydrocarbon compound, which thermally decomposes to give carbon partially in graphitized form, and calcining the mixture thus obtained at a temperature of at least 700° C.;

d) deagglomerating the product obtained in step c) in order to result in the composition.

16. An electrochemically active material in electrodes for sodium batteries or for sodium-ion batteries comprising the composition of claim 1.

17. A conductive composition comprising the composition as claimed in claim 1, at least one electron-conducting material and optionally a binder.

18. The conductive composition as claimed in claim 17, wherein the electron-conducting material is selected from the group consisting of carbon fibers, carbon black, carbon nanotubes, graphene and their analogs.

19. The conductive composition as claimed in claim 17 wherein the binder is selected from the group consisting of polytetrafluoroethylene, polyvinylidene fluoride, a copolymer of vinylidene fluoride and of at least one comonomer, polymers derived from carboxymethylcellulose, polysaccharides and latexes.

20. A positive electrode comprising a composition as claimed in claim 1.

* * * * *